(12) United States Patent
Butcher et al.

(10) Patent No.: US 10,549,748 B2
(45) Date of Patent: Feb. 4, 2020

(54) AUTONOMOUS MOTOR CONTROL DURING LOSS OF MOTOR COMMUNICATIONS

(71) Applicant: Ford Global Technologies, LLC, Dearborn, MI (US)

(72) Inventors: Jonathan Andrew Butcher, Farmington, MI (US); Francis Thomas Connolly, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 297 days.

(21) Appl. No.: 15/443,543

(22) Filed: Feb. 27, 2017

(65) Prior Publication Data
US 2018/0244265 A1  Aug. 30, 2018

(51) Int. Cl.
| | |
|---|---|
| *B60W 20/00* | (2016.01) |
| *B60W 20/50* | (2016.01) |
| *B60K 6/48* | (2007.10) |
| *B60W 10/06* | (2006.01) |
| *B60W 10/08* | (2006.01) |
| *B60W 10/26* | (2006.01) |
| *H02P 31/00* | (2006.01) |

(52) U.S. Cl.
CPC .............. *B60W 20/50* (2013.01); *B60K 6/48* (2013.01); *B60W 10/06* (2013.01); *B60W 10/08* (2013.01); *B60W 10/26* (2013.01); *H02P 31/00* (2013.01); *B60W 2510/081* (2013.01); *B60W 2510/244* (2013.01); *B60W 2710/0644* (2013.01); *B60W 2710/08* (2013.01); *B60W 2710/242* (2013.01); *B60Y 2200/92* (2013.01); *B60Y 2306/13* (2013.01); *B60Y 2400/112* (2013.01); *B60Y 2400/43* (2013.01); *B60Y 2400/60* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,405,818 B1 * | 6/2002 | Anthony | ................ | B60K 6/365 180/65.8 |
| 6,625,534 B2 * | 9/2003 | Suzuki | ..................... | B60K 6/48 701/62 |
| 6,757,599 B2 * | 6/2004 | Nada | ..................... | B60K 6/445 701/29.2 |
| 6,978,854 B1 * | 12/2005 | Kuang | ................... | B60K 6/445 180/65.235 |
| 8,535,201 B2 * | 9/2013 | Kuang | ................... | B60K 6/445 477/3 |
| 8,606,447 B2 * | 12/2013 | Namuduri | ............. | B60W 20/00 701/22 |
| 9,106,162 B2 | 8/2015 | Isayeva et al. | | |

(Continued)

*Primary Examiner* — Jonathan M Dager
(74) *Attorney, Agent, or Firm* — David Kelley; Brooks Kushman, P.C.

(57) ABSTRACT

A vehicle includes an electric motor and an engine selectively coupled to the electric motor. The vehicle has an electric motor controller configured to, in response to (i) an absence of receiving a motor command signal within a predetermined time, (ii) a battery voltage being below a first threshold and (iii) a motor speed exceeding a second threshold, restrict operation of the electric motor to a limited operating mode and control the electric motor to generate a charging torque for a battery.

20 Claims, 4 Drawing Sheets

(56) References Cited

U.S. PATENT DOCUMENTS

| | | | | |
|---|---|---|---|---|
| 9,114,709 B2* | 8/2015 | Stanek | | B60L 1/003 |
| 9,205,834 B1* | 12/2015 | Uehara | | B60W 20/50 |
| 9,315,190 B2* | 4/2016 | Yu | | B60W 20/40 |
| 9,735,720 B2* | 8/2017 | Luedtke | | H02P 23/009 |
| 9,828,925 B2* | 11/2017 | Slaton | | F01N 11/00 |
| 9,834,206 B1* | 12/2017 | Yang | | B60W 20/50 |
| 9,893,657 B2* | 2/2018 | Luedtke | | H02P 27/085 |
| 2001/0048226 A1* | 12/2001 | Nada | | F02N 11/0859 |
| | | | | 290/40 C |
| 2008/0006236 A1* | 1/2008 | Yamashita | | F02D 41/021 |
| | | | | 123/198 R |
| 2009/0192663 A1* | 7/2009 | Bennewitz | | B60W 20/50 |
| | | | | 701/31.4 |
| 2010/0145559 A1* | 6/2010 | Gauthier | | B60K 6/365 |
| | | | | 701/22 |
| 2010/0225258 A1* | 9/2010 | Namuduri | | B60K 6/485 |
| | | | | 318/400.3 |
| 2010/0236851 A1* | 9/2010 | Van Maanen | | B60L 3/0046 |
| | | | | 180/65.265 |
| 2011/0050174 A1* | 3/2011 | King | | B60L 53/20 |
| | | | | 320/134 |
| 2011/0101774 A1* | 5/2011 | Wagner | | B60L 3/0046 |
| | | | | 307/10.1 |
| 2011/0106348 A1* | 5/2011 | Krause | | B60K 6/46 |
| | | | | 701/21 |
| 2011/0144842 A1* | 6/2011 | Ni | | B60W 10/26 |
| | | | | 701/22 |
| 2012/0072066 A1* | 3/2012 | Kato | | B60K 6/365 |
| | | | | 701/22 |
| 2013/0173102 A1* | 7/2013 | Aldighieri | | B60L 50/50 |
| | | | | 701/22 |
| 2014/0062348 A1* | 3/2014 | Isayeva | | B60L 3/0061 |
| | | | | 318/139 |
| 2014/0062349 A1* | 3/2014 | Isayeva | | B60K 6/445 |
| | | | | 318/139 |
| 2014/0067173 A1* | 3/2014 | Isayeva | | B60W 50/035 |
| | | | | 701/22 |
| 2014/0077592 A1* | 3/2014 | Koch | | B60L 58/20 |
| | | | | 307/9.1 |
| 2014/0078630 A1* | 3/2014 | Koch | | B60W 50/02 |
| | | | | 361/86 |
| 2014/0081509 A1* | 3/2014 | Koch | | G07C 5/0808 |
| | | | | 701/29.2 |
| 2014/0163803 A1* | 6/2014 | Kamatani | | B60K 6/445 |
| | | | | 701/22 |
| 2014/0277882 A1* | 9/2014 | Isayeva | | H02H 7/09 |
| | | | | 701/22 |
| 2017/0036662 A1* | 2/2017 | Chen | | B60W 10/06 |
| 2017/0334427 A1* | 11/2017 | Butcher | | B60K 6/48 |
| 2018/0337624 A1* | 11/2018 | Moritake | | H02P 29/0241 |

* cited by examiner

AUTONOMOUS MOTOR CONTROL DURING LOSS OF MOTOR COMMUNICATIONS

TECHNICAL FIELD

This application is generally related to an electric motor system configured to operate during a loss of communication event between the electric motor system and a vehicle network.

BACKGROUND

Hybrid electric vehicles (HEVs) include an internal combustion engine, an electric machine such as an electric motor, and a traction battery. In these vehicles, signals are sent and received over a vehicle network. The electric motor system receives information over the vehicle network, including the motor torque necessary to meet vehicle performance requirements and driver demand. In the event of a loss of communication between the electric motor system and the vehicle network, several actions may be necessary to ensure continued operation of the vehicle. Since shutdown of the entire vehicle may be undesirable, limited operation strategy (LOS) modes can be implemented to prolong vehicle operation.

SUMMARY

According to embodiments of the present disclosure, a vehicle operating strategy is provided that allows a hybrid vehicle to continue its normal operation instead of automatically shutting down when there is a loss of communication between the electric motor system and the vehicle. During a loss of communication event, the electric motor system can still endeavor to keep the vehicle's electrical system in a working condition by controlling the electric motor (hereinafter referred to as simply "motor") such that a battery is maintained at a relatively fixed state of charge, thereby allowing continuous vehicle operation.

In one embodiment, a vehicle includes a motor and an engine selectively coupled to the motor. The vehicle has a motor controller configured to, in response to (i) an absence of receiving a motor command signal within a predetermined time, (ii) a battery voltage being below a first threshold and (iii) a motor speed exceeding a second threshold, restrict operation of the motor to a limited operating mode and control the motor to generate a charging torque for a battery. The motor command signal is indicative of a desired motor operating condition that includes at least one of a desired torque and a desired mode of operation. The charging torque is based on the battery voltage and an estimated battery state of charge. Also, the battery voltage is measured at an input to an inverter. The second threshold is a speed of the motor corresponding to one of an engine off condition and an engine starting condition. The motor controller is further configured to deactivate the motor responsive to the absence of receiving the motor command signal and the motor speed being less than the second threshold. And, the motor controller may be configured to initiate a discharge event responsive to the absence of receiving the motor command signal and the motor speed being equal to zero for a predetermined period of time. The discharge event may include discharging high voltage (HV) energy stored in at least one HV powertrain component. The HV powertrain component may be the inverter. The vehicle may further include a vehicle controller configured to monitor communication from the motor controller over a vehicle network. The vehicle controller is configured to output a command to maintain an engine speed above the second threshold responsive to the absence of communication from the motor controller over the vehicle network for a predefined time period and the vehicle not being in a shutdown mode.

In another embodiment, a powertrain module includes a motor controller configured to, in response to (i) an absence of receiving a motor command signal, (ii) a battery voltage being below a predetermined level, and (iii) a motor speed exceeding a threshold, control motor torque to charge a battery until the battery voltage exceeds the predetermined level. The battery voltage is measured at an input to an inverter and the motor command signal is indicative of a desired operating condition for the motor, wherein the desired operating condition includes at least one of a desired motor torque and a desired mode of operation for the motor. The controller is also configured to deactivate the motor responsive to the absence of receiving the motor command signal and the motor speed being less than the threshold. The controller is further configured to discharge high voltage (HV) energy stored in at least one HV powertrain component responsive to the motor speed being equal to zero for a predetermined time period.

In yet another embodiment, a method for controlling a vehicle powertrain includes restricting the motor to a limited operating mode and controlling the motor to output a charging torque to increase a battery state of charge in response to (i) an absence of receiving a motor command signal within a predetermined time, (ii) a battery voltage being below a first threshold and (iii) a motor speed exceeding a second threshold. The motor command signal includes at least one of a desired torque and a desired mode of operation and the charging torque is based on the battery voltage and the battery state of charge. The battery voltage is measured at an input to an inverter. The method also includes deactivating the motor responsive to the absence of receiving the motor command signal and the motor speed being less than the second threshold. The method further includes initiating a discharge event responsive to the motor speed being equal to zero for a predetermined amount of time, wherein the discharge event includes discharging high voltage (HV) energy stored in at least one HV powertrain component.

Embodiments according to the present disclosure include several advantages and benefits including the prevention of total vehicle shutdown in the event of a loss of communication between the motor system and vehicle network. Additionally, embodiments provide the ability to charge the battery during a loss of communication with the motor system with a low impact to vehicle drivability and overall functionality.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
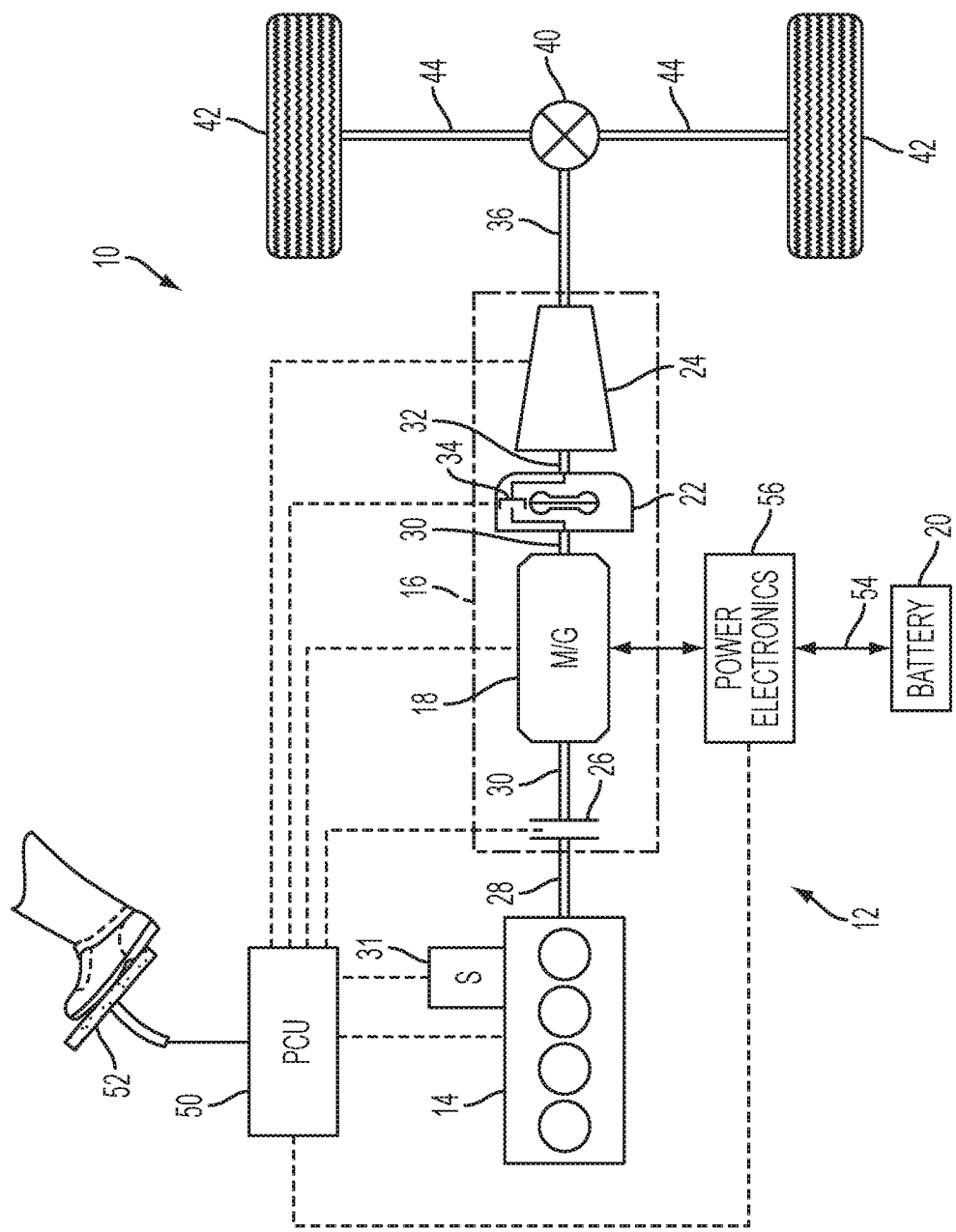
FIG. 1 is a schematic illustration of a HEV capable of implementing embodiments described herein.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). Separate additional controllers and their hierarchy will be described in more detail in FIG. 2. It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
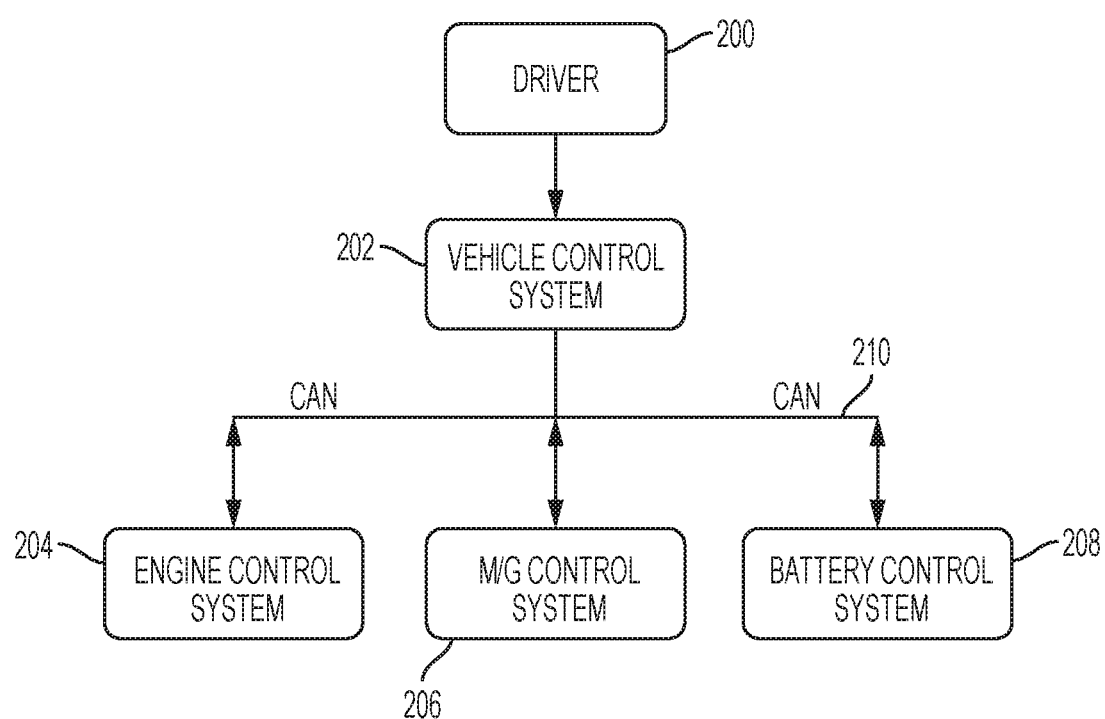
FIG. 2 is a block diagram illustrating an example of a control system of the vehicle of FIG. 1.

Referring to FIG. 2, a block diagram illustrating an example vehicle control system for vehicle 10 is shown. As shown, vehicle control system 202 receives signals and/or commands generated by driver inputs 200 (e.g., gear selection, accelerator position, and braking effort). The vehicle control system 202 processes these driver inputs 200 and communicates commands throughout the vehicle. The vehicle control system 202 may be electrically connected to various other powertrain control systems 204-208, such as the engine control system 204, M/G control system 206, and battery control system 208, for example, and may act as an overall controller of the vehicle. The vehicle control system 202 may be electrically connected to and communicate with various powertrain control systems 204-208 over a vehicle network 210. The vehicle network 210 continuously broadcasts data and information to the powertrain control systems 204-208. The vehicle network 210 may be a controlled area network (CAN) bus used to pass data to and from the vehicle control system 202 and other various controllers, subsystems or components thereof.

In hybrid vehicles, the motor system receives information over the vehicle network. Signals such as a desired torque, mode of operation, and other signals are sent and received on this network. In the event of a loss of communication between the motor system and vehicle network, several actions may be necessary to ensure continued operation of the vehicle. Since shutdown of the entire vehicle may be undesirable, limited operation strategy (LOS) modes can be implemented to prolong the operation of the vehicle.

Embodiments of the present disclosure provide a limited operation strategy that allows the vehicle to function during a loss of communication with the motor system. While not having normal functioning communication, the electric motor system can still endeavor to keep the vehicle's electrical system in a working condition, by keeping the high voltage (HV) electrical system at a stable operating voltage, thereby allowing the vehicle's DC/DC converter (or similar device) to keep the vehicle's 12V system charged and operating within normal limits. The electric motor controller is assumed to be still functional in all aspects except for vehicle network communications, which is the only way today that information is passed to the motor controller. In the absence of such information, the motor controller can automatically revert to a LOS mode of control designed to keep the HV battery at a relatively fixed state of charge, thereby allowing continuous vehicle operation.

Using this strategy, the vehicle will have a longer duration of operability during the loss of communication event. The disclosed strategy is designed to keep the battery voltage as measured using the inverter above a preset level or threshold (e.g., ~300V) when the motor speed is above a minimum speed (e.g., ~1000 rpm). This is accomplished by commanding the motor to apply a limited charging torque to the driveline (e.g., enough torque to generate ~5 kW or some other predetermined power threshold). For example, this may include applying a torque resistive to the motion of the combustion engine (i.e., called the charging torque) in order to generate electrical power. The amount of power could be a predetermined amount, or an amount corresponding to the voltage of the battery, or speed of the electric machine. The vehicle controller would also need to be aware of this strategy so that the engine is kept running for the duration of the drive cycle, as the speed of the engine/electric machine would need to be kept above the minimum threshold (e.g., ~1000 rpm) for the motor system to independently assume the role of charging the battery (assuming the battery voltage was below the preset level or threshold (e.g., ~300V)).

Figure 3:
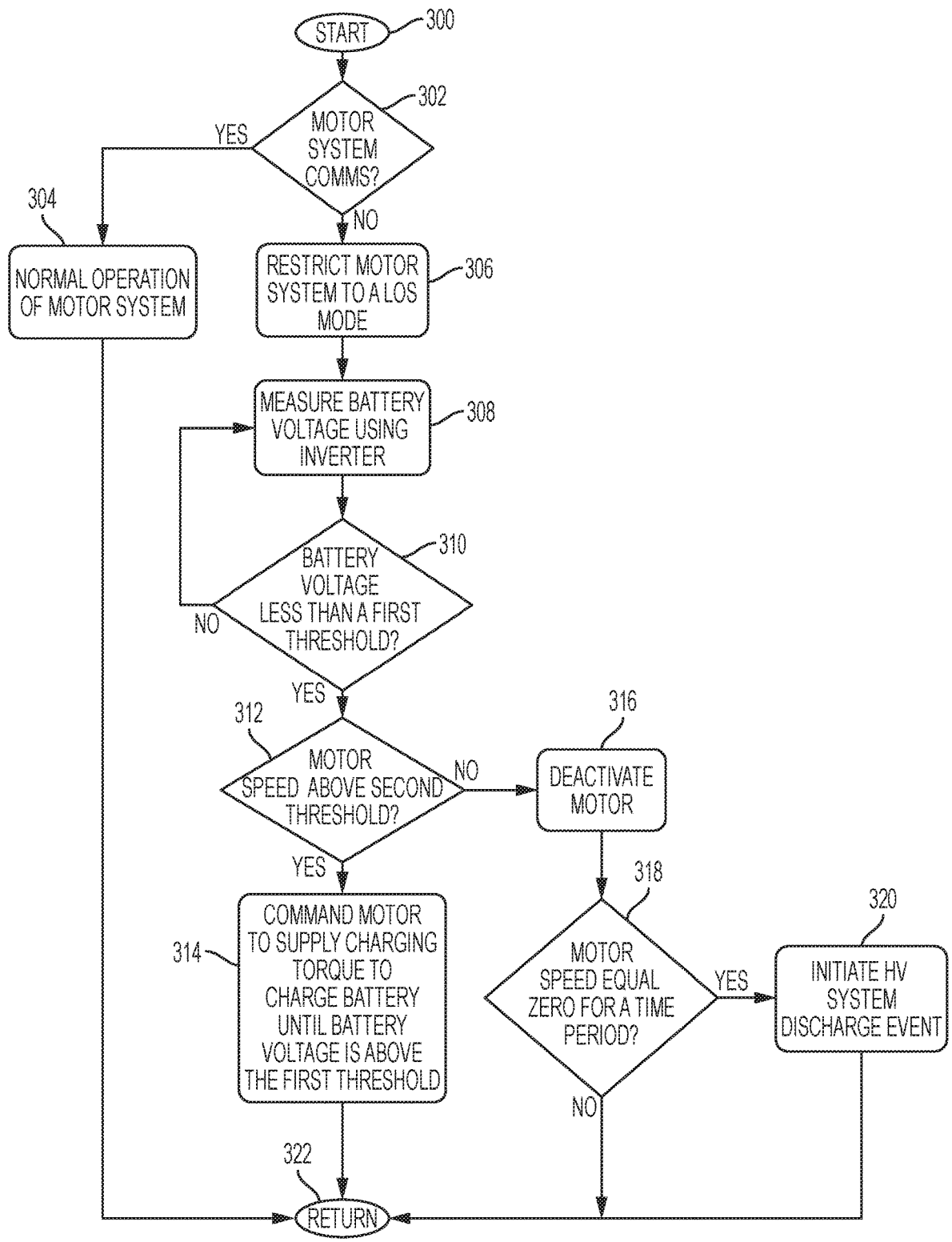
FIG. 3 is a flow chart describing a method for control of an electric motor system during a loss of motor communications in accordance with embodiments described herein.

Referring to FIG. 3, a flow chart is provided that describes a strategy for limited use of the motor during a loss of communication event with the motor system. The strategy begins at 300 and then proceeds to step 302 where it is determined if there is communication with the motor system over a vehicle network. As discussed above, the motor system receives information over the vehicle network. Motor command signals such as a desired torque, mode of operation, and other signals are sent and received on this network at regular intervals. The regular intervals may include periodic intervals and semi-periodic intervals. If the motor system receives these signals at regular intervals, then it will continue its normal operation at step 304 and the strategy ends at step 322. However, if the motor system does not receive these signals at regular intervals, then there is a loss of communication with the motor system and the strategy will proceed to step 306 where the motor will be restricted to a LOS mode designed to keep the battery at a relatively fixed state of charge, which allows for continuous vehicle operation.

In this LOS mode, the strategy determines a battery voltage using the inverter, as shown at step 308. In the absence of communication with the motor system, the only signals available to the motor system would be internally sensed parameters, such as motor speed, currents within motor/inverter system, DC voltage applied to the inverter and temperatures of the motor and inverter system. The battery voltage may be measured at the input of the inverter, i.e. the DC voltage applied to the inverter. The battery voltage (or, the input DC voltage to the inverter) can be used to determine the state of the battery. Specifically, the voltage of a battery decreases as the battery discharges and increases as the battery charges. So, the motor system can estimate a battery SOC based on the voltage applied to the inverter, or battery voltage, especially when the inverter is neither using or generating electrical power.

The strategy then proceeds to step 310, where it is determined whether the battery voltage is below a preset threshold (e.g., ~300V). Typically, the threshold will be a setpoint voltage that is calibrated to a safe battery SOC, such as 50%, for example. If the battery voltage is above the threshold, then the strategy returns to step 308 where the battery voltage is continually measured to see if it falls below the predetermined threshold. If the battery voltage is below the threshold at step 310, then the strategy proceeds to step 312 where it is determined if a motor speed is above a minimum threshold (e.g., ~1000 rpm). Motor speeds below the minimum threshold would be indicative of the engine being off or starting. If the motor speed is above the minimum threshold, then the strategy proceeds to step 314 where motor torque is controlled to charge the battery until the battery voltage is above the preset threshold. If the motor speed is below the minimum threshold, then the strategy proceeds to step 316 where the motor is deactivated. In this manner, the controller would not apply torque when the engine was off, or starting. The strategy then proceeds to step 318 where it is determined if the motor speed equals zero for a predetermined period of time. If the motor speed does not equal zero for a predetermined period of time, then the strategy ends at step 322.

If the motor speed is equal to zero for a predetermined period of time at step 318, then the strategy proceeds to step 320 where it initiates a HV system discharge event, which is a desirable event when shutting off any HEV or electrified vehicle. This event discharges HV energy stored in the inverter capacitors (and other capacitors in any HV powertrain component) during a vehicle power down sequence after the HV battery is disconnected from the HV bus. The motor controller is responsible for this discharge event, and could begin the event at a predetermined time (e.g., 5 seconds) after the motor speed has reached zero. In this way, the motor controller would be using the speed of the motor as an indication from the vehicle controller that a vehicle shutdown is in process. The strategy then ends at step 322.

The vehicle control system (outside of the motor controller) would also need to be aware of this strategy, and endeavor to keep the engine running for the duration of the drive cycle, as the speed of the engine/electric machine would need to be kept above the minimum threshold (e.g., ~1000 rpm) for the motor controller to independently assume the role of charging the battery and ensure the continued operation of the vehicle.

Figure 4:
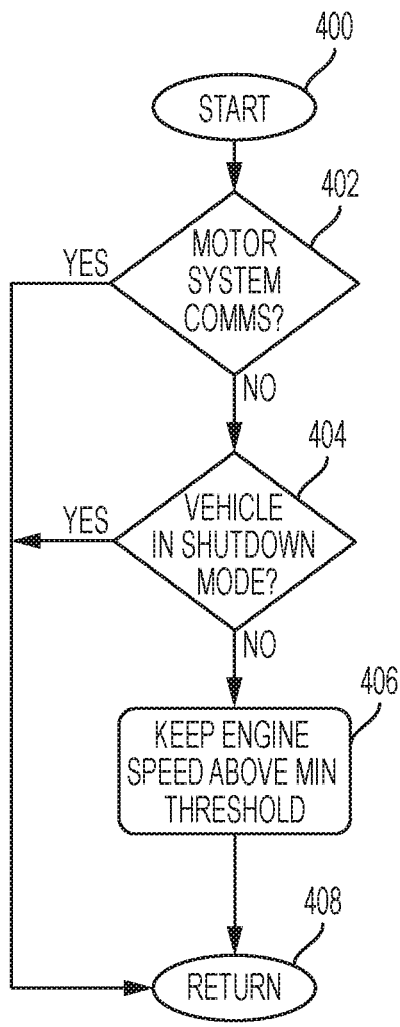
FIG. 4 is a flow chart describing a method for control of a vehicle control system during a loss of motor communications in accordance with embodiments described herein.

Referring to FIG. 4, a flow chart illustrates a strategy for maintaining engine speed above the minimum threshold during a loss of communication event with the motor system. The strategy begins at 400 and proceeds to step 402 where it is determined if there has been a loss of communication with the motor system. As discussed above, the vehicle systems, including the motor system, communicate with each other via the vehicle network. The vehicle controller can be configured to monitor communication from the motor system over the vehicle network. If there is communication from the motor over the vehicle network at step 402, then the strategy ends at 408. In the absence of communication from the motor over the vehicle network for a predetermined amount of time, the vehicle controller determines there is loss of communication with motor and proceeds to step 404. The strategy then determines at step 404 whether the vehicle is currently involved in a vehicle shutdown process or in power down mode. If the vehicle is involved in a vehicle shutdown, then the strategy ends at 408. If the vehicle is not in a power down mode, then the strategy proceeds to step 406 where engine speed is controlled to be maintained above the minimum threshold (e.g., ~1000 rpm) and then ends at step 408.

Embodiments according to the present disclosure include several advantages and benefits including the prevention of total vehicle shutdown in the event of a loss of communication between the motor system and vehicle network. Additionally, embodiments provide the ability to charge the battery during a loss of communication with the motor system with a low impact to vehicle drivability and overall functionality.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle, comprising:
a motor configured to exchange energy with a battery;
an engine selectively coupled to the motor; and
a motor controller configured to, in response to (i) an absence of receiving a motor command signal within a predetermined time, (ii) a battery voltage being below a first threshold and (iii) a motor speed exceeding a second threshold, restrict operation of the motor to a limited operating mode and control the motor to generate a charging torque for the battery.

2. The vehicle of claim 1, wherein the motor command signal is indicative of a desired motor operating condition that includes at least one of a desired torque and a desired mode of operation.

3. The vehicle of claim 1, wherein the charging torque is based on the battery voltage and an estimated battery state of charge.

4. The vehicle of claim 1, wherein the battery voltage is measured at an input to an inverter.

5. The vehicle of claim 1, wherein the second threshold is a speed of the motor corresponding to one of an engine off condition and an engine starting condition.

6. The vehicle of claim 5, wherein the motor controller is further configured to deactivate the motor responsive to the absence of receiving the motor command signal and the motor speed being less than the second threshold.

7. The vehicle of claim 1, wherein the motor controller is further configured to initiate a discharge event responsive to the absence of receiving the motor command signal and the motor speed being equal to zero for a predetermined period of time, wherein the discharge event includes discharging high voltage (HV) energy stored in at least one HV powertrain component.

8. The vehicle of claim 7, wherein the at least one HV powertrain component is an inverter.

9. The vehicle of claim 1, further comprising:
a vehicle controller configured to monitor communication from the motor controller over a vehicle network, wherein the vehicle controller is configured to output a command to maintain an engine speed above the second threshold responsive to the absence of communication from the motor controller over the vehicle network for a predefined time period and the vehicle not being in a shutdown mode.

10. A powertrain control unit, comprising:
a motor controller configured to, in response to (i) an absence of receiving a motor command signal, (ii) a battery voltage associated with a battery connected to the motor being below a predetermined level, and (iii) a motor speed exceeding a threshold, control motor torque to charge the battery until the battery voltage exceeds the predetermined level.

11. The powertrain control unit of claim 10, wherein the battery voltage is measured at an input to an inverter.

12. The powertrain control unit of claim 10, wherein the motor command signal is indicative of a desired operating condition for a motor, wherein the desired operating condition includes at least one of a desired motor torque and a desired mode of operation for the motor.

13. The powertrain control unit of claim 10, wherein the motor controller is further configured to deactivate the motor responsive to the absence of receiving the motor command signal and the motor speed being less than the threshold.

14. The powertrain control unit of claim 13, wherein the motor controller is further configured to discharge high voltage (HV) energy stored in at least one HV powertrain component responsive to the motor speed being equal to zero for a predetermined time period.

15. A method of controlling a vehicle powertrain having a motor, comprising:
in response to (i) an absence of receiving a motor command signal within a predetermined time, (ii) a battery voltage being below a first threshold and (iii) a motor speed exceeding a second threshold, restricting the motor to a limited operating mode and controlling the motor to output a charging torque to increase a battery state of charge.

16. The method of claim 15, wherein the motor command signal includes at least one of a desired torque and a desired mode of operation.

17. The method of claim 15, wherein the charging torque is based on the battery voltage and the battery state of charge.

18. The method of claim 15, wherein the battery voltage is measured at an input to an inverter.

19. The method of claim 15, further comprising:
deactivating the motor responsive to the absence of receiving the motor command signal and the motor speed being less than the second threshold.

20. The method of claim 15, further comprising:
initiating a discharge event responsive to the motor speed being equal to zero for a predetermined amount of time, wherein the discharge event includes discharging high voltage (HV) energy stored in at least one HV powertrain component.

* * * * *